May 7, 1957 W. A. V. THOMSEN 2,791,123
MECHANICAL MOTION TRANSMITTING DEVICE
Filed June 24, 1955 2 Sheets-Sheet 1
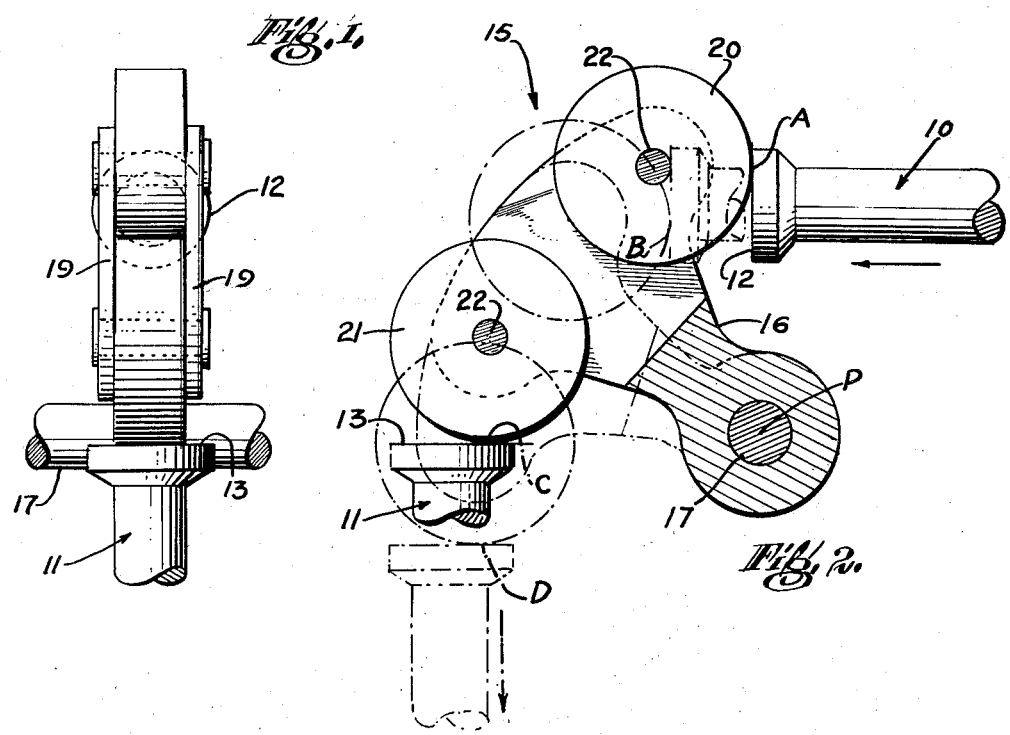
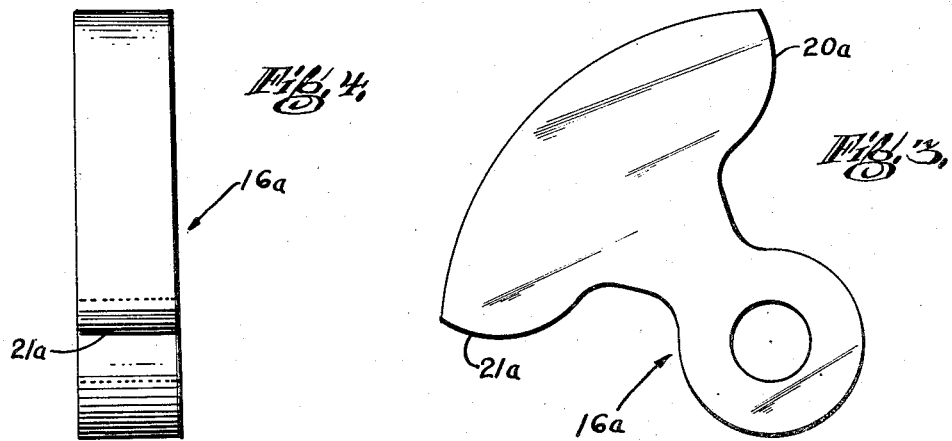
INVENTOR
William A. V. Thomsen
BY
Ernest A. Joerren
ATTORNEY May 7, 1957  W. A. V. THOMSEN  2,791,123
MECHANICAL MOTION TRANSMITTING DEVICE
Filed June 24, 1955  2 Sheets-Sheet 2

INVENTOR
William A. V. Thomsen
BY
ATTORNEY

United States Patent Office 2,791,123
Patented May 7, 1957

2,791,123

MECHANICAL MOTION TRANSMITTING DEVICE

William A. V. Thomsen, Glen Ridge, N. J., assignor to Specialties Development Corporation, Belleville, N. J., a corporation of New Jersey Application June 24, 1955, Serial No. 517,711

10 Claims. (Cl. 74—110)

The present invention relates to machine elements and mechanisms, and, more particularly, to a mechanical motion transmitting device which has a mechanical advantage during the initial portion of its stroke.

In various mechanisms where movement of a member is effected by applying a thrust thereon, initial movement of the member may be resisted by friction or adhesion between the member and a fixed member at the instance the means for applying the thrust exert its minimum force. For example, this difficulty occurs in valves which are unseated by solenoids.

In order to overcome the foregoing difficulty, it has been customary to utilize a sufficiently large and powerful solenoid to assure unseating of the valve. In many applications where weight and bulk are highly disadvantageous, the use of oversize solenoids is not feasible.

Accordingly, an object of the present invention is to overcome the foregoing difficulties and disadvantages by providing a thrust transmitting mechanism which has a mechanical advantage at initial application of the thrust and thereby overcomes resistance to motion.

Another object is to provide such mechanism which is simple and economical, is light in weight, and occupies a minimum of space.

A further object is to provide such mechanism which readily lends itself to a wide variety of uses and applications.

A still further object is to provide such mechanism which is particularly adapted for use in connection with solenoid operated devices.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by providing a motion transmitting device which comprises two members each slidably mounted and having an end face; one of the members being adapted to be so moved by force applying means and the other member being adapted to be moved to effect movement of or act on another element; and pivotally mounted lever means having two curved surface sections, in the form of cams or roller means, each tangentially disposed with respect to one of the end faces for engagement thereby, with the points of engagement being spaced predetermined distances from the axis about which the lever means pivots to determine the leverage ratio of the device.

In the illustrative embodiments about to be described herein, the slidable members and the lever means are so constructed and arranged that the effective lever arm, determined by this distance, on which the thrust is exerted, for example by a slidable member of a solenoid, initially is greater than the effective lever arm which transmits the thrust to a slidable operating member, whereby the force transmitted is greater than the force applied.

In the drawings:

Fig. 1 is a fragmentary end elevational view of a device in accordance with the present invention.

Fig. 2 is a fragmentary side elevational view of the device shown in Fig. 1, illustrating the operation thereof.

Fig. 3 is an end elevational view of a modified lever adapted for use in connection with the device shown in Figs. 1 and 2.

Fig. 4 is a side elevational view of the lever shown in Fig. 3.

Figure 5:
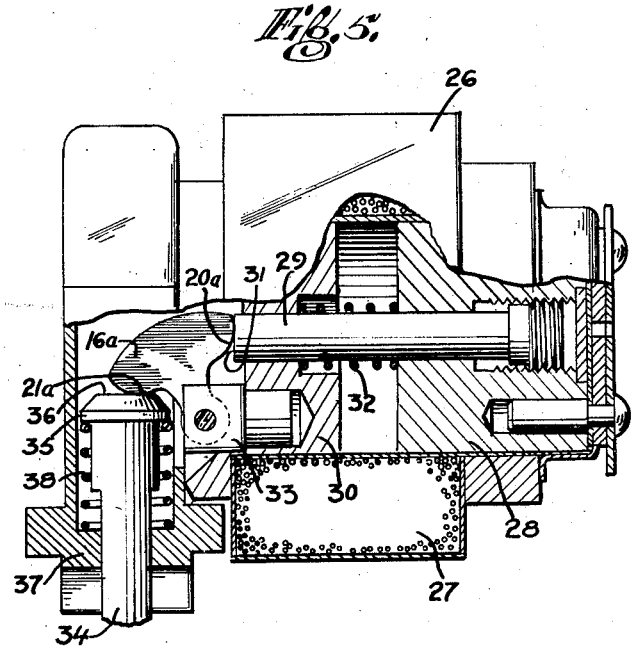
Fig. 5 is a side view of a solenoid operated device embodying the lever shown in Figs. 3 and 4, partly in section and partly in elevation.

Referring to Figs. 1 and 2 of the drawings in detail, a mechanical motion transmitting device is shown which comprises rods 10 and 11 slidably mounted (not shown) for movement along their longitudinal axes in substantially the same plane with the longitudinal axes intersecting each other and perpendicularly disposed; substantially flat end faces 12 and 13 on the rods 10 and 11, respectively, disposed in intersecting planes perpendicular to each other and their respective longitudinal axes; and lever means 15 mounted for pivotal movement about an axis P substantially perpendicular to the plane in which the longitudinal axes of the rods 10 and 11 are disposed and at which axis the planes in which the end faces 12 and 13 are disposed happen to intersect.

In this embodiment of the invention, the lever means comprise a lever 16 tiltably mounted on a shaft 17 at one end thereof and having spaced apart plate portions 19 at the free end thereof, two rollers 20 and 21, which provide the curved surface sections herein, are disposed between the plate portions, and pins 22 for rotatably mounting the rollers on the lever with their outer peripheries tangentially disposed for engagement by the faces 12 and 13, respectively.

In order to demonstrate the operation of this device, the initial positions of the elements just described are shown in full lines and the final positions thereof are shown in broken lines in Fig. 2. The face 12 and the roller 20 engage at point A in their initial position and at point B in their final position; and the face 13 and the roller 21 engage at point C in their initial position and at point D in their final position.

When the rod 10 is moved to the left (as viewed) by suitable mechanism (not shown), the lever is rocked counterclockwise (as viewed) and the rod 11 is moved downwardly (as viewed to actuate an element not shown). During such movement, the points of engagement between the faces and rollers shift from A to B and from C to D, respectively.

The device is constructed and arranged so that the distance between point A and axis P is greater than the distance between point C and axis P, whereby, during the initial portion of the stroke, the transmitted thrust is amplified. For example, if the ratio of these distances is 4 to 3 and applied force is 60 pounds, the transmitted force will be 80 pounds at the outset. This is very desirable because the additional force of 20 pounds may be required to overcome friction or adhesion of parts to be moved by the rod 11.

As the stroke progresses, the mechanical advantage is lessened. When the distances between the points of contact and the axis P are equal, there is no mechanical advantage or leverage; and, as the stroke progresses beyond that position to the final position, the mechanical advantage is reversed. This however, is not detrimental because a lesser transmitted force may be desirable at the completion of the stroke. In fact, the reversal of the mechanical advantage can be utilized to initiate movement in the return stroke as will be made apparent hereinafter.

While two rollers are shown, it will be appreciated that the same result can be attained with a single somewhat larger roller which has curved surface sections thereon in engagement with the end faces.

In Figs. 3 and 4, a lever 16a is shown having integrally formed cams 20a and 21a which provide the curved surface sections. The curvature of these sections may be circular or generally involute.

In Fig. 5, there is shown a device in accordance with the present invention which utilizes the lever 16a and is used in conjunction with a solenoid. This solenoid operated mechanism comprises a housing 26, a coil 27 in the housing, an armature 28 slidably movable within the coil, a plunger 29 (the equivalent of rod 10) carried by the armature which extends through a wall section 30 of the housing and has an end face 31 (the equivalent of face 12), a return spring 32 biased between the armature and the wall section, a bracket 33 supported by the wall section 30 on which the lever 16a is pivotally mounted with the cam 20a thereof in engagement with the end face 31, a plunger 34 (the equivalent of rod 11) having a head 35 formed with an end face 36 (the equivalent of face 12) in engagement with the cam 21a and extending through a wall section 37 of the housing, and a return spring 38 biased between the head 35 and the wall section 37.

Upon energization of the solenoid, the plunger 29 applies a thrust on the lever 16a which thrust is transmitted to the plunger 34 in the manner described in connection with the device shown in Fig. 2. Thus, by constructing and arranging the device to provide a leverage ratio of 4 to 3, for example, between the axis P and the initial points of engagement, a mechanical advantage is attained during the initial portion of the stroke. Such an arrangement can be beneficially utilized in connection with solenoids, because the thrust force of a solenoid is weakest at the beginning of its stroke, due to the air gap between the coil and the armature, but increases during the travel of the armature.

Figure 6:
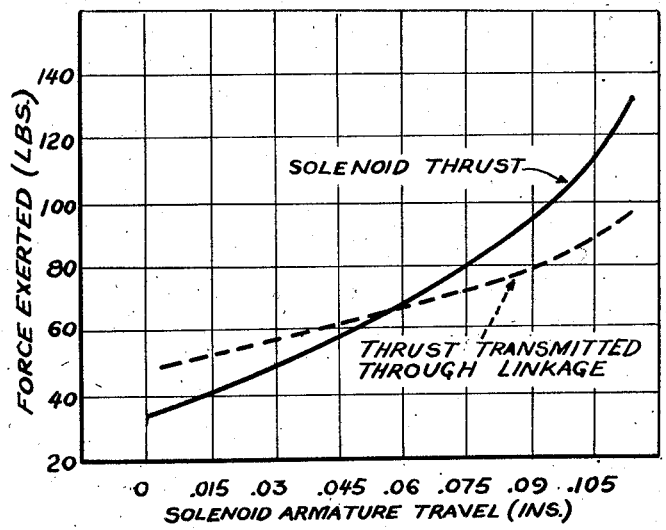
Fig. 6 is a diagram illustrating the relation of the thrust force exerted by the solenoid and the thrust force transmitted during movement of the solenoid armature from its initial position to its final position.

To illustrate this more clearly, a force-distance diagram is shown in Fig. 6 wherein the full line designates the solenoid thrust force exerted by the plunger 29 plotted against the distance of armature travel and the broken line designates the exerted thrust force transmitted to the plunger 34 plotted against armature travel.

From this diagram, it will be seen that the transmitted force is greater than the applied force during the initial portion of the stroke by reason of the mechanical advantage whereby friction and adherence can be overcome without resorting to a larger, heavier and more powerful solenoid. At the point where the curves cross, there is no mechanical advantage and, to the right of this point, the transmitted force is less than the applied force. However, this is unimportant because the solenoid thrust force is approaching its peak and is greater than required, whereby the advantage gained can now be sacrificed without detriment. In other words, while the work done by the plunger 29 and the plunger 34 is about equal, the plunger 34 is rendered capable of exerting a greater force than the solenoid provides during initial movement.

Also, the spring 38 of the solenoid operated mechanism shown in Fig. 5 is loaded by compression thereof at the end of the stroke while the mechanical advantage is reversed, whereby when the solenoid is deenergized the force of the spring is amplified to effect rapid return of the solenoid armature. In this manner, the force sacrificed during the final portion of the forward stroke is regained during the initial portion of the return stroke.

From the foregoing description, it will be seen that the present invention provides a simple, practical and economical mechanical motion transmitting device which assures more rapid and positive movement of an element to be operated while maintaining the size, weight and power of the thrust providing means, such as the solenoid, to a minimum.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A mechanical motion transmitting device comprising two members slidably mounted for movement along their longitudinal axes in substantially the same plane with the longitudinal axes intersecting each other and each having a substantially flat end face disposed in intersecting planes; force applying means for effecting sliding movement of one of said members; and lever means mounted for pivotal movement about an axis substantially perpendicular to the plane in which the longitudinal axes of said members are disposed, said lever means having two curved surface sections each substantially tangentially disposed to one of said two end faces, respectively, for engagement thereby, with the points of engagement being spaced predetermined distances from the axis about which said lever means pivots and the longitudinal axes of said members to determine the leverage ratio of the device.

2. A device according to claim 1, wherein one of said distances initially is greater than the other.

3. A device according to claim 2, wherein said one distance finally is smaller than the other.

4. A device according to claim 3, wherein said one distance is the distance between the point of engagement on said end face of said member acted on by said force applying means and the axis about which said lever means pivots.

5. A device according to claim 1, wherein the planes in which said end faces are disposed intersect at the axis about which said lever means pivots when said members are in their intermediate positions, and the longitudinal axes of said members are substantially perpendicular.

6. A device according to claim 1, wherein said curved surface sections are provided by roller means mounted on said lever means for rotation about an axis parallel to the axis about which said lever means pivots.

7. A device according to claim 1, wherein said curved surface sections are provided by fixed cams formed integral with said lever means.

8. A device according to claim 1, including a solenoid having an armature which constitutes said force applying means.

9. A mechanical motion transmitting device comprising two members slidably mounted for movement along their longitudinal axes with the planes in which said axes are disposed intersecting each other at a substantially right angle and each of said members having a substantially flat transverse end surface facing the intersection of the planes; force applying means for effecting sliding movement of one of said members; and a lever element mounted for pivotal movement about an axis substantially perpendicular to the plane in which the longitudinal axes of said members are disposed, said lever element having two substantially identical arcuate cam surfaces each substantially tangentially disposed to one of said two end faces with the midpoints of the arcs defining said surfaces being about a quadrant apart, for engagement thereby, and one of said faces engaging its cam surface radially outwardly of the midpoint thereof and the other of said faces engaging its cam surface radially inwardly of the midpoint thereof when said members are at their end positions of movements.

10. A mechanical motion transmitting device comprising a solenoid having a plunger formed with a transverse end face; a housing mounted adjacent said solenoid; a lever element pivotally supported between said solenoid and said housing, said lever element having two substantially identical arcuate cam surfaces with the midpoints of the arcs defining said surfaces being about a quadrant apart, and said solenoid plunger end face engaging one of said cam surfaces radially outwardly of the midpoint thereof when in its inactive position; and a second plunger slidably supported by said housing at substantially a right angle to said solenoid plunger and having a transverse end face engaging said other cam surface radially inwardly of the midpoint thereof when in its inactive position, whereby upon energization of said solenoid the force initially transmitted to said second plunger is greater than the thrust force of said solenoid.

References Cited in the file of this patent

UNITED STATES PATENTS

| | | |
|---|---|---|
| 1,449,611 | Konigslow | Mar. 27, 1923 |
| 1,654,020 | Schmidt | Dec. 27, 1927 |
| 1,741,677 | Brewer | Dec. 31, 1929 |
| 2,572,106 | Burrell | Oct. 23, 1951 |